United States Patent
Bousquet

(10) Patent No.: US 6,526,064 B1
(45) Date of Patent: Feb. 25, 2003

(54) METHOD FOR TRANSMITTING ON A PLURALITY OF TRANSMISSION MEDIA, WITH DYNAMIC DATA DISPATCHING, AND CORRESPONDING TRANSMITTER AND TERMINAL

(75) Inventor: Jacques Bousquet, Croissy sur Seine (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/180,774

(22) PCT Filed: Mar. 27, 1998

(86) PCT No.: PCT/FR98/00643
§ 371 (c)(1),
(2), (4) Date: Nov. 13, 1998

(87) PCT Pub. No.: WO98/44688
PCT Pub. Date: Oct. 8, 1998

(30) Foreign Application Priority Data

Mar. 28, 1997 (FR) .............................. 97 03892

(51) Int. Cl.$^7$ ................................................ H04J 13/00
(52) U.S. Cl. ..................................... 370/441; 370/401
(58) Field of Search ................ 370/352, 401, 370/389, 444, 450; 455/117

(56) References Cited

U.S. PATENT DOCUMENTS 5,539,744 A * 7/1996 Chu et al. ............... 370/397
5,633,868 A * 5/1997 Baldwin et al. ........... 370/331
5,812,538 A * 9/1998 Wiedeman et al. ........ 370/401
6,272,325 B1 * 8/2001 Wiedeman et al. ........ 455/117
6,298,065 B1 * 10/2001 Dombkowski et al. .... 370/420
6,373,831 B1 * 4/2002 Secord et al. ............. 370/441

FOREIGN PATENT DOCUMENTS

EP 0 667 695 A1 8/1995
FR 2 737 366 A1 1/1997

OTHER PUBLICATIONS

Q. Chen et al, Multicarrier CDMA with Adaptive Frequency Hopping for Mobile Radio Systems, IEEE Journal on Selected Areas in Communications, vol. 14, No. 9, Dec. 1996, pp. 1852–1858.
C. Brendan et al, "Striping within the Network Subsystem", IEEE Network: The Magazine of Computer Communications, vol. 9, No. 4, Jul. 1, 1995, pp. 22–32.

* cited by examiner

Primary Examiner—Salvatore Cangialosi
(74) Attorney, Agent, or Firm—Sughrue Mion, PLLC

(57) ABSTRACT

The invention concerns a method of transmitting data from a plurality of sources ($22_i$) to a plurality of receivers (24) via a single gateway (21) using at least two separate data transmission media ($23_i$), said receivers (24) being able to receive selectively data transmitted on any of said transmission media ($23_i$), the method being characterized in that it assures dynamic distribution of said data to be transmitted to said transmission media ($23_i$) in accordance with a global analysis of all of said data to be transmitted, signalling data (32; 42) regularly specifying to each of said receivers (24) the transmission medium or media ($23_i$) it is to use.

15 Claims, 1 Drawing Sheet

METHOD FOR TRANSMITTING ON A PLURALITY OF TRANSMISSION MEDIA, WITH DYNAMIC DATA DISPATCHING, AND CORRESPONDING TRANSMITTER AND TERMINAL

The field of the invention is that of transmitting data from a plurality of sources to a plurality of receivers via a single gateway.

The invention applies, for example, although not exclusively, to broadcasting data via satellites to terminals that are isolated and/or to which access is difficult.

A preferred field of application of the invention is that of broadcasting high bit rate data, for example in the context of the Internet.

There are very many systems for transmitting to a plurality of receivers, of course. The information to be transmitted is multiplexed in such cases.

Such systems include:
conventional time division multiplexing (TDM) whereby the data is sent in sequence using frame organization, each frame being formed of a series of time slots each allocated to one call;
frequency division multiplexing (FDM) in which each call is allocated to a respective carrier frequency; and
code division multiplexing (CDM) in which the signals of all calls are transmitted simultaneously on the same carrier, each having been multiplied beforehand by a code selected so that it is orthogonal to all the other codes (with multiplication by the same code in the receiver recovering the source signal).

The conventional TDM approach is based on using time division multiplexing on a single carrier frequency.

For improving the TDM technique consideration has been given to using two of the above techniques simultaneously to obtain a multicarrier TDM system. In this case the receiver is informed of the carrier frequency that it must use by signalling data.

FIG. 1 shows a prior art system of the above kind.

Consider the case of n calls to be transmitted each having a given bit rate $d_1$ through $d_n$. To transmit these calls to n receivers p carrier frequencies are provided (p being less than n).

In this case each call $11_1$ through $11_n$ is allocated to one of the carrier frequencies $12_1$ through $12_p$ for the entire call. The receiver 13 is tuned to the appropriate carrier frequency $f_i$.

The bit rate obtained on each carrier $f_I$ is:

$$S_i = \sum_{j=1}^{n_j} \overline{d}_j$$

$n_j$ being the number of calls transmitted on the carrier $f_i$.
Of course, the total bit rate obtained:

$$\sum_{i=1}^{p} S_i = \sum_{i=1}^{p}\sum_{j=1}^{n_j} \overline{d}_j$$

remains less than the potential bit rate S.

Allocating resources in the above manner is not optimal. For example, consider the particular case of a queue of n servers with a Poisson type distribution, in which case the method obeys Erlang's law. With the same number of overall circuits and given probability of blocking, this is not favorable to server utilization with segmentation into small independent subsystems (i.e. subsystems using a small number of servers).

The prior art is also represented by document FR 2 737 366 which concerns a device for transmitting data from a plurality of sources to a plurality of receivers via a single gateway using a plurality of sub-carriers to transmit packets of data. However, the above device does not provide a global analysis of all the data to be transmitted to maximize the use of available transmission resources.

Finally, document EP 0 667 695 describes a data transmission method in which the data to be exchanged is distributed between a plurality of carriers transmitted in parallel, each radio station being fixedly allocated a particular number of carriers. This fixed allocation of frequencies rules out optimizing the use of available transmission resources.

An object of the invention is to mitigate the above drawbacks of the prior art.

To be more precise, an object of the invention is to provide a method of transmitting on a plurality of carrier frequencies suited to transmitting a plurality of streams of data to separate receivers which maximizes the use of available transmission resources.

In particular, an object of the invention is to provide a method of the above kind suitable for transmitting data signals organized into blocks or packets, for example data broadcast over the Internet.

Another object of the invention is to provide a method of the above kind that does not significantly increase the complexity and/or the unit cost of the corresponding terminals.

The above objects, and others that become apparent hereinafter, are achieved according to the invention by a method of transmitting data from a plurality of sources to a plurality of receivers via a single gateway using at least two separate data transmission media, said receivers being able to receive selectively data transmitted on any of said transmission media, the method being characterized in that it assures dynamic distribution of said data to be transmitted to said transmission media in accordance with a global analysis of all of said data to be transmitted, signalling data regularly specifying to each of said receivers the transmission medium or media it must use.

In other words, the invention assures global dynamic allocation, optimizing use of the radio resource.

In one advantageous embodiment of the invention in the context of multicarrier transmission said transmission media are carrier frequencies.

In another embodiment of the invention in the context of CDMA transmission said transmission media can be codes.

Said data is advantageously organized into packets of data, each packet being sent on a particular transmission medium.

The destination information specifying the receiver to which a data packet is addressed can be transmitted:
in said packet itself in the form of a packet header; or
by means of a transmission medium dedicated to transmitting destination information.

These can be packets conforming to the Internet data transfer protocol.

The invention is particularly advantageous in situations in which the number of transmission media is very much lower than the number of sources (for example one for every few dozen).

The invention also concerns a transmitter for a system for transmitting data from a plurality of sources to a plurality of receivers, the transmitter being characterized in that it comprises:

transmission means using at least two separate data transmission media, said receivers being able to receive selectively data transmitted on any one of said transmission media;

means for dynamically distributing said data to be transmitted to said transmission media in accordance with a global analysis of all of said data to be transmitted; and means for generating signalling data regularly specifying to each of said receivers the transmission medium or media it must use.

A transmitter of the above kind advantageously further comprises means for temporarily storing blocks of data addressed to one of said receivers.

This optimizes it for transferring packets of data.

The invention further concerns the transmitter/receiver terminals used in the context of the method described hereinabove. The terminals include means for receiving data transmitted in response to a request using a transmission method employing at least two separate data transmission media, said terminal being adapted to receive selectively data transmitted on any one of said transmission media and assuring dynamic distribution of said data to be transmitted to said transmission media in accordance with a global analysis of all of said data to be transmitted, signalling data regularly specifying to said terminal the transmission medium or media that it is to use.

Other features and advantages of the invention become more clearly apparent on reading the following description of a preferred embodiment given by way of illustrative and non-limiting example only and from the accompanying drawings, in which:

FIG. 1, already commented on in the preamble, shows a conventional multicarrier TDM system;

Figure 1:
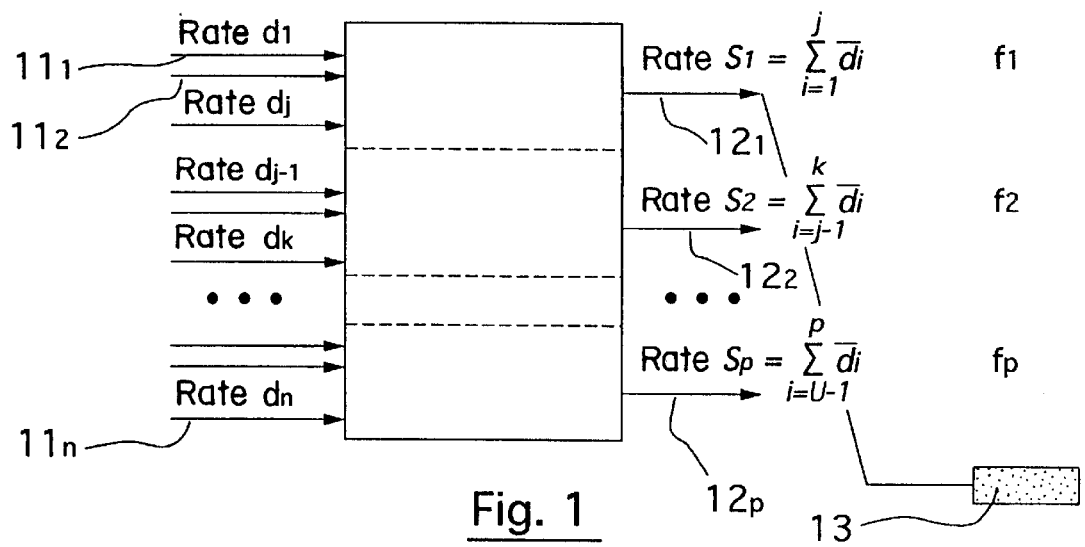
Figure 2:
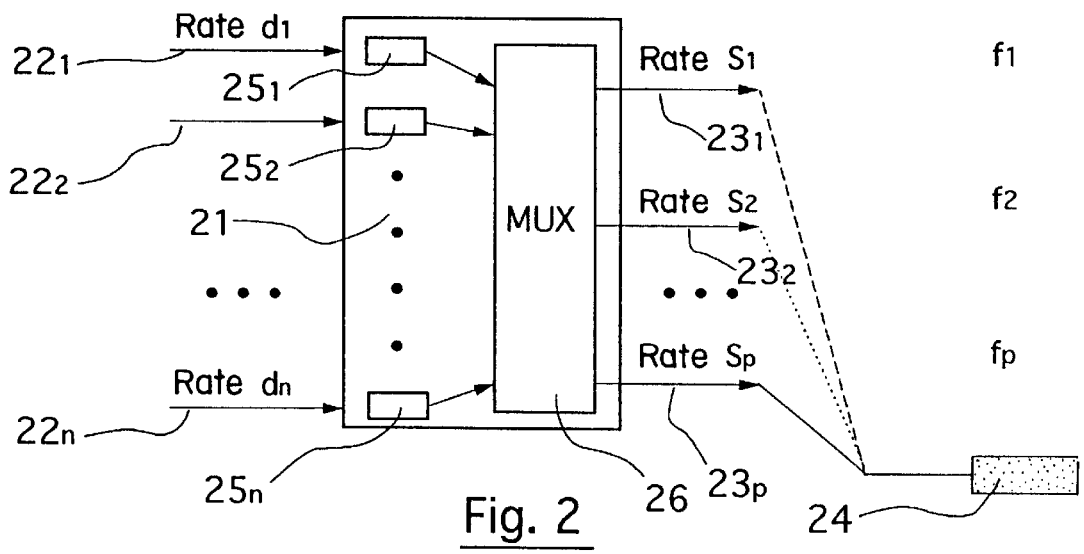
FIG. 2 shows a global dynamic allocation system of the invention.

FIG. 2 therefore shows the general principle of the invention. The gateway 21 receives data to be transmitted from n separate sources $22_1$ through $22_n$ corresponding for example to information to be transmitted to a user in response to a request submitted to an Internet server.

The gateway 21 distributes the data received between the p carrier frequencies $23_1$ and $23_p$ it can use. Each single-frequency receiver 24 tunes its demodulating frequency in order to receive the carrier frequency $23_I$ on which information addressed to it is transmitted.

The new approach of the invention is based on the fact that none of the receivers 24 is tied to a single carrier. The transmitter adopts a global approach to optimizing the distribution of data. Consequently, the data of the same call is divided between a plurality of carrier frequencies as time proceeds and the receiver 24 adapts accordingly by frequency hopping.

This flexibility at the transmit level, referred to as global dynamic allocation, yields a global bit rate S equal to the sum of the bit rates of each carrier frequency, which optimizes the use of radio resources.

The data received at each input $22_i$ is stored temporarily in a buffer memory $25_i$ for forming data packets, for example packets conforming to the Internet protocol. When the packet is completed it is transmitted to a multiplexer 26 which routes it to the chosen carrier frequency.

Figure 3:
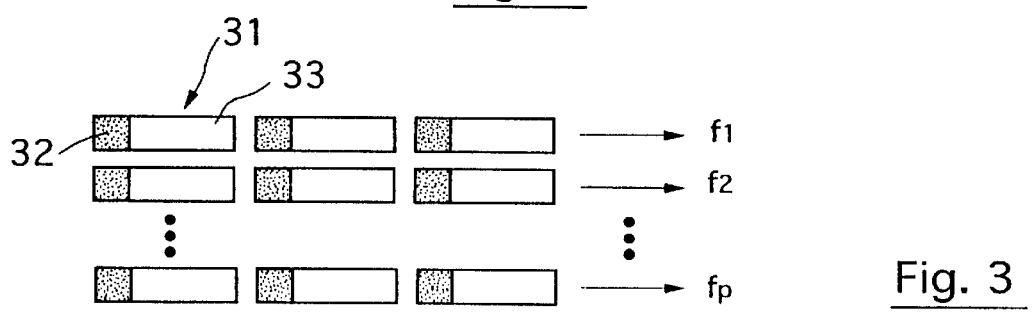
FIGS. 3 and 4 show two modes of broadcasting information on the destination of packets transmitted by the system from FIG. 2.

The information specifying the receiver to which a data package is addressed can be transmitted in each packet, as shown in FIG. 3. Each packet 31 has a header 32 which, among other things, specifies the identity of the addressee and a data field. The receivers receive the packets, read the header and then read the data fields 33 of packets that are addressed to them.

Figure 4:
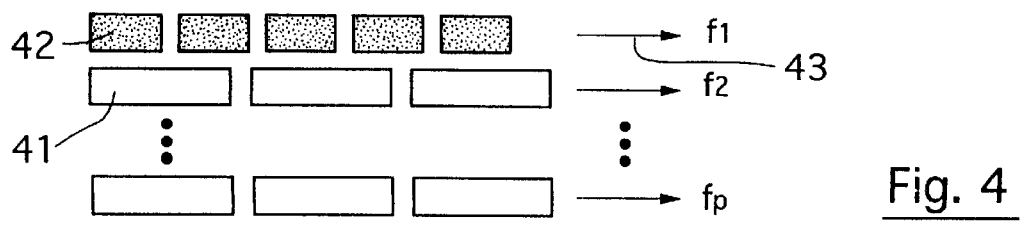

The transmitted packets 41 can equally comprise only payload data, as shown in FIG. 4. In this case the information 42 specifying the receiver to which a data package is addressed can be transmitted by means of one (or more) transmission media 43 dedicated to transmitting address information.

The embodiment described hereinabove is based on the use of a plurality of carrier frequencies. It is nevertheless clear that some other type of transmission medium can be used, and in particular a CDM system. In this case, p codes rather than p carrier frequencies are transmitted.

It is also possible to combine the two techniques using a plurality of codes and a plurality of carrier frequencies simultaneously (CDM/FDM system).

Note also that, although the embodiment described has receivers that can receive a single carrier (or decode a single code), the invention applies equally to situations in which the receiver can receive simultaneously data transmitted on several (generally a relatively low number of) transmission media.

What is claimed is:

1. A method of transmitting data from a plurality of sources ($22_i$) to a plurality of receivers (24) via a single gateway (21) using at least two separate data transmission media ($23_i$), said receivers (24) being able to receive selectively data transmitted on any of said transmission media ($23_i$), the method being characterized in that it assures dynamic distribution of said data to be tansmitted to said transmission media ($23_i$) in accordance with an a is of all of said data to be transmitted, signalling data (32; 42) specifying to each of said receivers (24) regularly throughout the transmission of said data the transmission medium or media ($23_i$) it is to use.

2. A method according to claim 1, characterized in that in the context of multicarrier transmission said transmission media ($23_i$) are carrier frequencies.

3. A method according to claim 1, characterized in that in the context of CDMA transmission said transmission media are codes.

4. A method according to claim 1, characterized in that said data is organized into data packets (31; 41), each packet being transmitted on a predetermined transmission medium.

5. A method according to claim 4, characterized in that information specifying the receiver to which a data packet (31; 41) is addressed is transmitted:

in said packet itself in the form of a packet header (32); or by means of a transmission medium (43) dedicated to transmitting destination information.

6. A method according to claim 1, characterized in that the number of transmission media ($23_i$) is very much lower than the number of sources ($22_i$).

7. A method according to claim 1, characterized in that data of a same call between said receiver and a same transmitter is divided between said transmission media as time proceeds, the regularly specifying to each of said receivers the transmission medium or media it is to use being performed for each change of said transmission media as time proceeds.

8. A method according to claim 7, wherein assuring the dynamic distribution of said data to be t ed to said transmission media in accordance with an analysis of all of said data to be transmitted optimizes a distribution of data among the transmission media to yield a global bit rate via the single gateway equal to a sum of bit rates of each transmission medium.

9. A transmitter for a system for transmitting data from a plurality of sources ($22_i$) to a plurality of receivers (24), the transmitter being characterized in that it comprises:

transmission means (21) using at least two separate data transmission media ($23_i$), said receivers (24) being able to receive selectively data transmitted on any one of said transmission media ($23_i$);

means (21) for dynamically distributing said data to be transmitted to said transmission media ($23_i$) in accordance with a global analysis of all of said data to be transmitted; and means for generating signalling data (32; 42) regularly specifying to each of said receivers (24) the transmission medium or media ($23_i$) it is to use.

10. A transmitter according to claim 7, characterized in that it further comprises means ($25_i$) for temporarily storing blocks of data addressed to one of said receivers (24).

11. A transmitter according to claim 9, characterized in that data of a same call between one of said receivers and said transmitter is divided between said transmission media as time proceeds, wherein the means for generating signalling data regularly specifies to each of said receivers the transmission medium or media it is to use at each change of said transmission media as time proceeds.

12. A transmitter according to claim 11, wherein said means for dynamically distributing said data to be transmitted performs the analysis of all of said data to be transmitted and optimizes a distribution of data among the transmission media in accordance with the global analysis to yield a global bit rate for the transmitter equal to a sum of bit rates of each transmission medium.

13. A transmitter/receiver terminal, characterized in that it comprises means for receiving data transmitted in response to a request using a transmission method employing at least two separate data transmission media ($23_i$), said terminal being adapted to receive selectively data transmitted on any one of said transmission media ($23_i$) and assuring dynamic distribution of said data to be transmitted to said transmission media ($23_i$) in accordance with a global analysis of all of said data to be transmitted, signalling data (32; 42) regularly specifying to said terminal the transmission medium or media that it is to use.

14. A transmitter/receiver terminal according to claim 13, characterized in that data of a same call between said transmitter/receiver terminal and a same transmitter is divided between the transmission media as time proceeds, wherein the transmitter/receiver terminal receives said signaling data at each change of the transmission media as time proceeds.

15. A transmitter/receiver terminal according to claim 14, wherein assuring the dynamic distribution of said data to be transmitted to said transmission media in accordance with an analysis of all of said data to be transmitted optimizes a distribution of data among the transmission media to yield a global bit rate equal to a sum of bit rates of each transmission medium.

* * * * *